(12) United States Patent
Gilbert et al.

(10) Patent No.: US 6,437,894 B1
(45) Date of Patent: Aug. 20, 2002

(54) FIBER DISTRIBUTION SHELF ASSEMBLY FOR A FIBER ADMINISTRATION SYSTEM HAVING INTEGRAL LINE TRACING CAPABILITIES

(75) Inventors: Albon E. Gilbert, Hoschton, GA (US); Mark R. Jennings, Andover, NJ (US); David W. Landry, Suwanee, GA (US); Frank S. Leone, Berkley Heights; Richard J. Pimpinella, Hampton, both of NJ (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/210,292

(22) Filed: Dec. 11, 1998

(51) Int. Cl.[7] .............................................. H04B 10/00
(52) U.S. Cl. ...................................... 359/163; 359/165
(58) Field of Search .................................. 359/109, 110, 359/163, 165; 385/15, 145

(56) References Cited

U.S. PATENT DOCUMENTS

| | | | | |
|---|---|---|---|---|
| 4,817,202 A | * | 3/1989 | Meyer et al. ................ 455/603 |
| 4,829,596 A | * | 5/1989 | Barina ......................... 455/612 |
| 4,863,232 A | * | 9/1989 | Kwa ........................... 350/96.2 |
| 5,394,503 A | * | 2/1995 | Dietz, Jr. et al. ............ 385/135 |
| 5,448,675 A | * | 9/1995 | Leone et al. ................. 385/135 |
| 5,497,465 A | * | 3/1996 | Chin et al. ................... 395/280 |
| 5,594,576 A | * | 1/1997 | Sutherland et al. ......... 359/118 |
| 5,689,604 A | * | 11/1997 | Janus et al. ................. 385/134 |
| 5,793,909 A | * | 8/1998 | Leone et al. .................. 385/24 |
| 5,960,130 A | * | 9/1999 | Pimpinella .................... 385/15 |
| 6,222,975 B1 | * | 4/2001 | Gilbert et al. ............... 385/134 |

* cited by examiner

Primary Examiner—Leslie Pascal
Assistant Examiner—Dalzid Singh
(74) Attorney, Agent, or Firm—Gibbons, Del Deo, Dolan, Griffinger & Vecchione

(57) ABSTRACT

A fiber administration system and improved components for use in a fiber administration system. The fiber administration system includes at least one fiber distribution shelve that supports a plurality of optical connection ports. Each of the optical connection ports contains a sensor for detecting the presence of an optical coupling in that optical connection port. A systems controller is coupled to the sensor of each of the optical connection ports. Accordingly, the systems controller can automatically determine from the sensors whether or not an optical coupling is present in each of the optical connection ports.

20 Claims, 5 Drawing Sheets

FIBER DISTRIBUTION SHELF ASSEMBLY FOR A FIBER ADMINISTRATION SYSTEM HAVING INTEGRAL LINE TRACING CAPABILITIES

BACKGROUND OF THE INVENTION

1. Field of the Invention

The present invention relates to the structure of fiber distribution shelves on which optical fibers are terminated in a fiber administration system. More particularly, the present invention relates to fiber distribution shelves in fiber administration systems that embody line tracing capabilities that help a technician locate a specific optical connection port on the fiber distribution shelf.

2. Description of the Prior Art

There are many applications that utilize an optical fiber network to establish optical communications between a host digital terminal (HDT) at a central office and an optical network unit (ONU) at a remote location. Since a central office serves as the point of origin for the optical fibers in the optical fiber network, fiber administration systems are typically used at the central office to manage the flow of optical signals as they are directed to the various ONUs along the different optical fibers in the network.

In many fiber administration systems, as the optical fibers in a network enter the central office, they are directed into an optical distribution frame where the individual optical fibers are terminated in an organized manner. Such fiber administration systems are exemplified by the LGX® fiber administration system which is currently manufactured by Lucent Technologies of Murray Hill, New Jersey, the assignee herein. In such fiber administration systems, the optical distribution frames used at the central office are typically large structures that are arranged in parallel rows. Each optical distribution frame is commonly mounted between the floor and ceiling and only a few feet separate each row of frames.

Each optical distribution frame located at the central office typically defines a plurality of bays, wherein each bay houses several fiber distribution shelves. On each of the fiber distribution shelves are optical connection ports that receive the ends of all of the individual optical fibers that enter the central office and are contained within the optical fiber network. By terminating each optical fiber at an optical connection port on one of the different fiber distribution shelves, the location of each optical fiber becomes known within the overall assembly. Once terminated at a known address on one of the fiber distribution shelves, each optical fiber can be selectively coupled to a HDT or a variety of other optical equipment located at the central office. As a result, the optical signals sent along each optical fiber can be selectively controlled.

A fiber distribution system may contain hundreds or thousands of optical connection ports. In order to maintain the quality and integrity of the fiber administration system, the various optical fibers are periodically disconnected from the optical network and are connected to various types of test equipment. Additionally, as the fiber network grows, certain optical fibers get rerouted within the fiber administration system. It is often difficult for a technician to find a specific optical connection port in the hundreds of optical connection ports available in a fiber administration system. Accordingly, it is not uncommon for a technician to accidently select the wrong optical connection port and disrupt an optical fiber pathway that should not have been disrupted.

In an attempt to assist a technician in finding a specific optical connection port, tracing systems have been developed that provide a visible indication as to the location of a targeted optical connection port. Such prior art tracing systems are exemplified by U.S. Pat. No. 5,448,675 to Leone, entitled Telecommunications Distribution Frame With Tracing. In such systems, a light is lit next to the optical connection port being targeted. A technician can see the light and is immediately led to the targeted optical connection port. The light is an LED that is positioned next to each of the optical connection ports. The LEDs are built into the fiber distribution shelves that support the optical connection ports.

In addition to LEDs, signal buttons are also built into the fiber distribution shelves. The signal buttons are commonly located next to the LED. Accordingly, for each optical connection port on a fiber distribution shelf there is a corresponding LED and signal button. The signal buttons are typically used to signal when a specific optical connection port has been serviced. For example, if the tracing system of the fiber administration system lights an LED next to a specific optical connection port, a technician can press the signal button to signal the systems controller that the proper optical connection port has been located. The signal buttons are also used to initiate a trace via the systems controller of the fiber administration system. For example, if a technician wants to know where a specific optical fiber leads, the technician can press the signal button at one end of the optical fiber. The systems controler will then trace the fiber and light the LED next to any other optical connection port where that optical fiber may lead. The depression of the signal button is the only direct method that the systems controller has to detect whether a particular optical fiber has been added to or removed from a specific optical connection port.

A problem associated with prior art systems that use LEDs and signal buttons is that the LEDs and signal buttons are small and are densely packed together on the fiber distribution shelf next to the optical connection ports. Accordingly, it is not uncommon for a technician to associate a particular LED or a particular signal button with the wrong optical connection port. This often results in the technician disrupting the wrong optical pathway within the fiber administration system.

A need therefore exists for an apparatus and method that better identify a specific optical connection port on a fiber distribution shelf having line tracing capabilities. A need also exists for an improved fiber administration shelf structure that would eliminate the need for a technician to press a signal button when an optical fiber is serviced.

SUMMARY OF THE INVENTION

The present invention is a fiber administration system and improved components for use in a fiber administration system. The fiber administration system includes at least one fiber distribution shelf that supports a plurality of optical connection ports. Each of the optical connection ports contains a sensor for detecting the presence of an optical coupling in that optical connection port. A systems controller is coupled to the sensor of each of the optical connection ports. Accordingly, the systems controller can automatically determine from the sensors whether or not an optical coupling is present in each of the optical connection ports.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Figure 1:
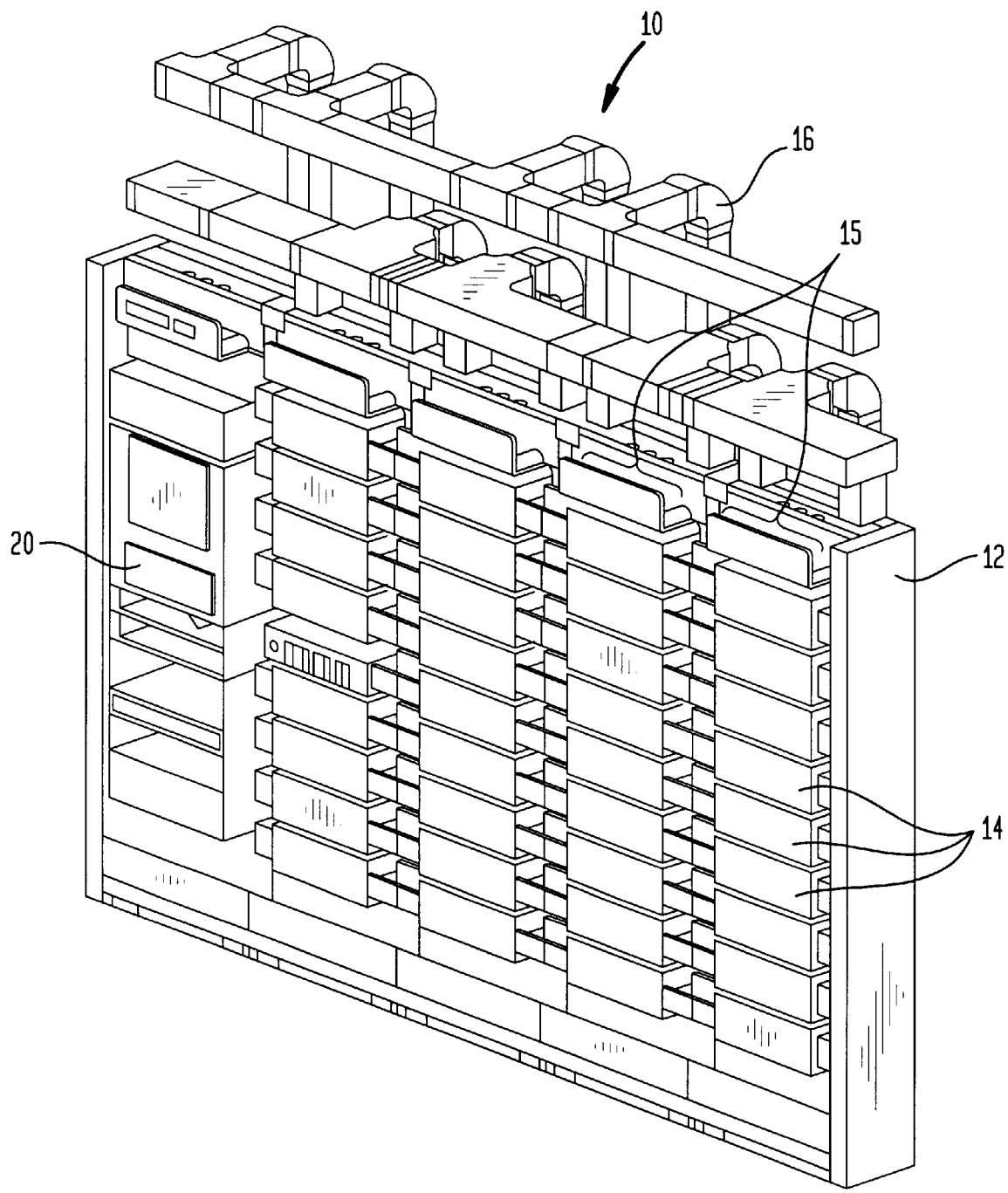
FIG. 1 is a perspective view of an optical fiber administration system containing a first plurality of bays and a second plurality of fiber distribution shelves in each bay.

In FIG. 1, a fiber administration system 10 is shown. The exemplary fiber administration system 10 includes an optical fiber distribution frame 12 that is affixed in a set position to the floor of a central office. The fiber distribution frame 12 defines a plurality of bays 15. Each bay 15 is a vertical structure that supports a plurality of fiber distribution shelves 14. The fiber distribution shelves 14 come in one of three standard sizes, having a five inch height, a seven inch height or a nine inch height. A network of conduits 16 lead the various optical fibers from the optical fiber network to the fiber distribution shelves 14.

In addition to the fiber distribution shelves, the fiber administration system also includes a systems controller 20. The systems controller 20 runs the line tracing software used in the line tracing operations of the fiber administration system 10.

Figure 2:
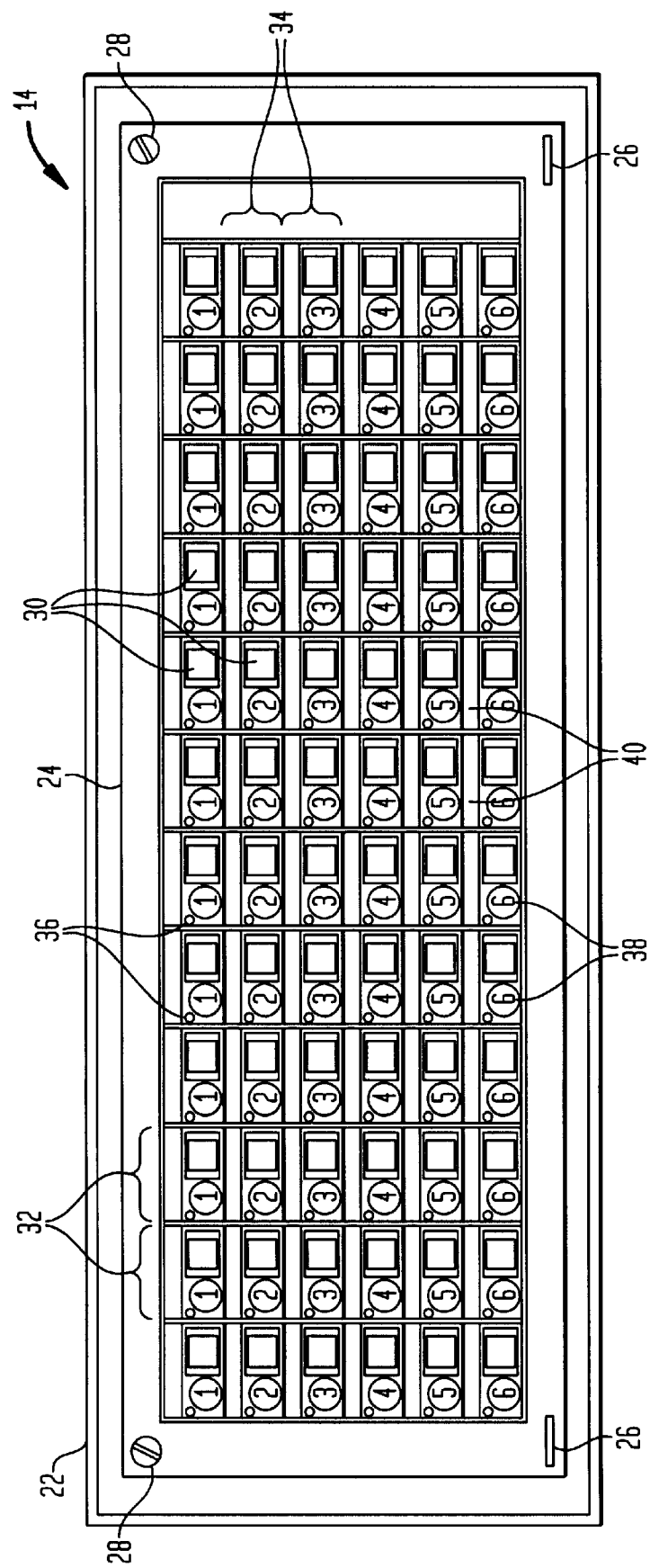
FIG. 2 is a front view of a fiber distribution shelf containing a face panel assembly in accordance with the present invention.

Referring to FIG. 2, a front view of a fiber distribution shelf 14 is shown. The fiber distribution shelf 14 contains a housing 22. The front of the housing is covered by a removable face panel assembly 24. The face panel assembly 24 contains hinge apertures 26 and mounting screws 28 that enable the face panel assembly 24 to mount to the front of the fiber distribution shelf 14. As such, the face panel assembly 24 is the section of the fiber distribution shelf 14 that faces a technician when a technician is servicing the fiber distribution shelf 14.

The shown face panel assembly 24 supports seventy two optical connection ports 30 in twelve columns 32 and six rows 34. The number of connection ports 30 supported by the shown face panel assembly 24, however, is merely exemplary. As such it should be understood that the number of columns 32 and rows 34 can be altered as desired.

Each of the optical connection ports 30 supported by the face panel assembly 24 are located in a unique box that is associated with one of the columns 32 and one of the rows 34. In each box, in addition to the optical connection port 30, there is located an LED 36, a signal button 38, and a label area 40 for writing. The signal button 38 is large and is located directly next to the optical connection port 30. Accordingly, the association between the signal button 38 and the optical connection port 30 in the same box would be hard to mistake. The LED 36 located immediately adjacent to the signal button 38 is in the same box. Accordingly, the association between the LED 36, and both the signal button 38 and the optical connection port 30 would also be difficult to mistake.

The label area 40 is located directly above the LED 36, signal button 38 and optical connection port 30. The label area 40 provides a technician the ability to identify each of the boxes in writing with a desired designation.

Figure 3:
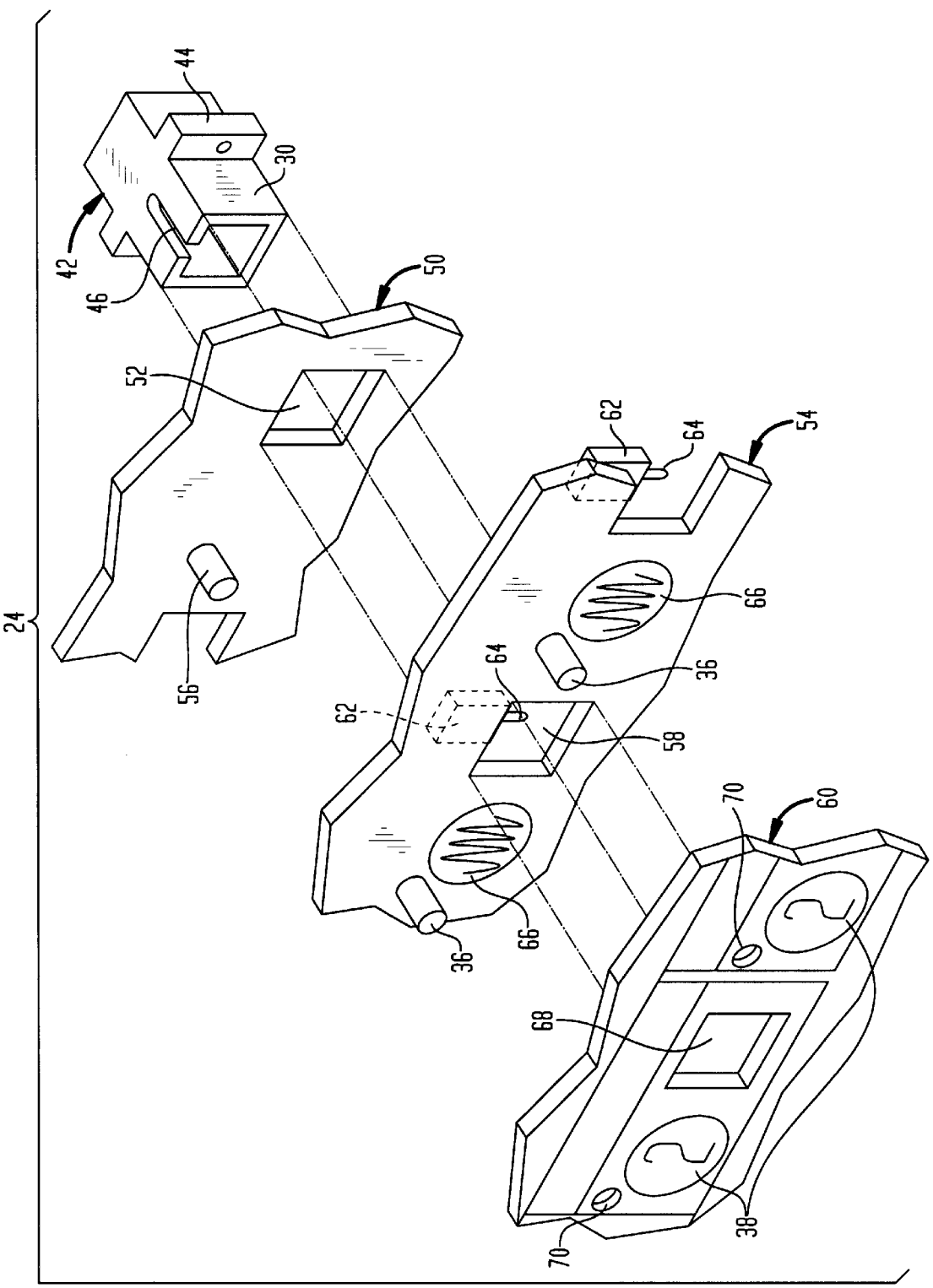
FIG. 3 is a fragmented, exploded, perspective view of a segment of the face panel assembly shown in FIG. 2.

Referring to FIG. 3, it can be seen that the face panel assembly 24 has a layered construction. The thickness of the face panel assembly 24 is typically less than an inch. Within this space, the layered construction includes a mounting plate 50, optical connector couplings 42, a printed circuit board 54 and a display panel 60. The mounting plate 50 supports the optical connector couplings 42 and the printed circuit board 54. The display panel 60 lays over the printed circuit board 54 to complete the assembly 24.

In the face panel assembly 24, the optical connection ports 30 shown in FIG. 2 are the forward segments of optical connector couplings 42 that protrude from the face panel assembly 24. In the shown exemplary embodiment, the optical connector coupling 42 is a double female coupling having mounting flanges 44 that protrude from the sides of the optical connector coupling 42 near its midpoint.

A slot 46 is formed in at least the forward end of the optical connector coupling 42. The slot 46 traverses the housing of the optical connector coupling 42 and extends from its interior to its exterior.

A mounting plate 50 is provided that contains apertures 52. The forward end of the optical connector coupling 42 passes through the aperture 52. The mounting flanges 44 of the optical connector prevent the entire optical connector coupling 42 from passing through the aperture 52. The optical connector coupling 42 is held in place on the mounting plate 50 by a spring clip or some other type of mechanical fastener (not shown).

The face panel assembly 24 also contains a printed circuit board 54. The printed circuit board 54 mounts to the mounting plate 50. Spacers 56 separate the circuit board 54 from the mounting plate 50, wherein the circuit board 54 is held in a plane parallel to that of the mounting plate 50. Apertures 58 are formed in the circuit board 54. When the circuit board 54 is attached to the mounting plate 50, the apertures 58 on the circuit board 54 align with the apertures 52 on the mounting plate 50. Consequently, the forward end of the optical connector coupling 42 extends through the aperture 58 in the circuit board 54.

In the shown embodiment, a microswitch 62 is mounted to the circuit board 54 above each aperture 58 in the circuit board 54. The microswitch 62 contains a mechanical actuator 64 that extends below the main body of the microswitch 62 and into the area defined by the aperture 58. As the face panel assembly 28 is assembled, the mechanical actuator 64 of the microswitch 62 passes into the slot 46 on the forward end of the optical connector coupling 42. The purpose of this arrangement will be later explained.

The LED 36 associated with each optical connection port 30 and the contact element 66 for each signal button 38 are contained as components on the circuit board 54. Accordingly, there is a signal button contact element 66 and an LED 36 associated with each aperture 58 in the circuit board 54.

A display panel 60 attaches to the front of the circuit board 54. The display panel 60 contains a primary aperture 68 that aligns with the aperture 58 in the circuit board 54. Accordingly, when the face panel assembly 24 is fully assembled, the forward end of the optical connector coupling 42 extends through the primary aperture 68 in the display panel 60.

The display panel 60 also contains a smaller secondary aperture 70. The smaller secondary aperture 70 aligns with the LED 36 on the circuit board 54. Accordingly, with the display panel 60 in place, the LED 36 on the circuit board 54 can still be seen.

A resilient signal button 38 is formed on the display panel 60. The resilient signal button 38 aligns with the contacts 66 of the signal switch on the circuit board 54. Accordingly, when someone depresses the resilient signal button 38, the contact 66 on the circuit board 54 is engaged.

Figure 4:
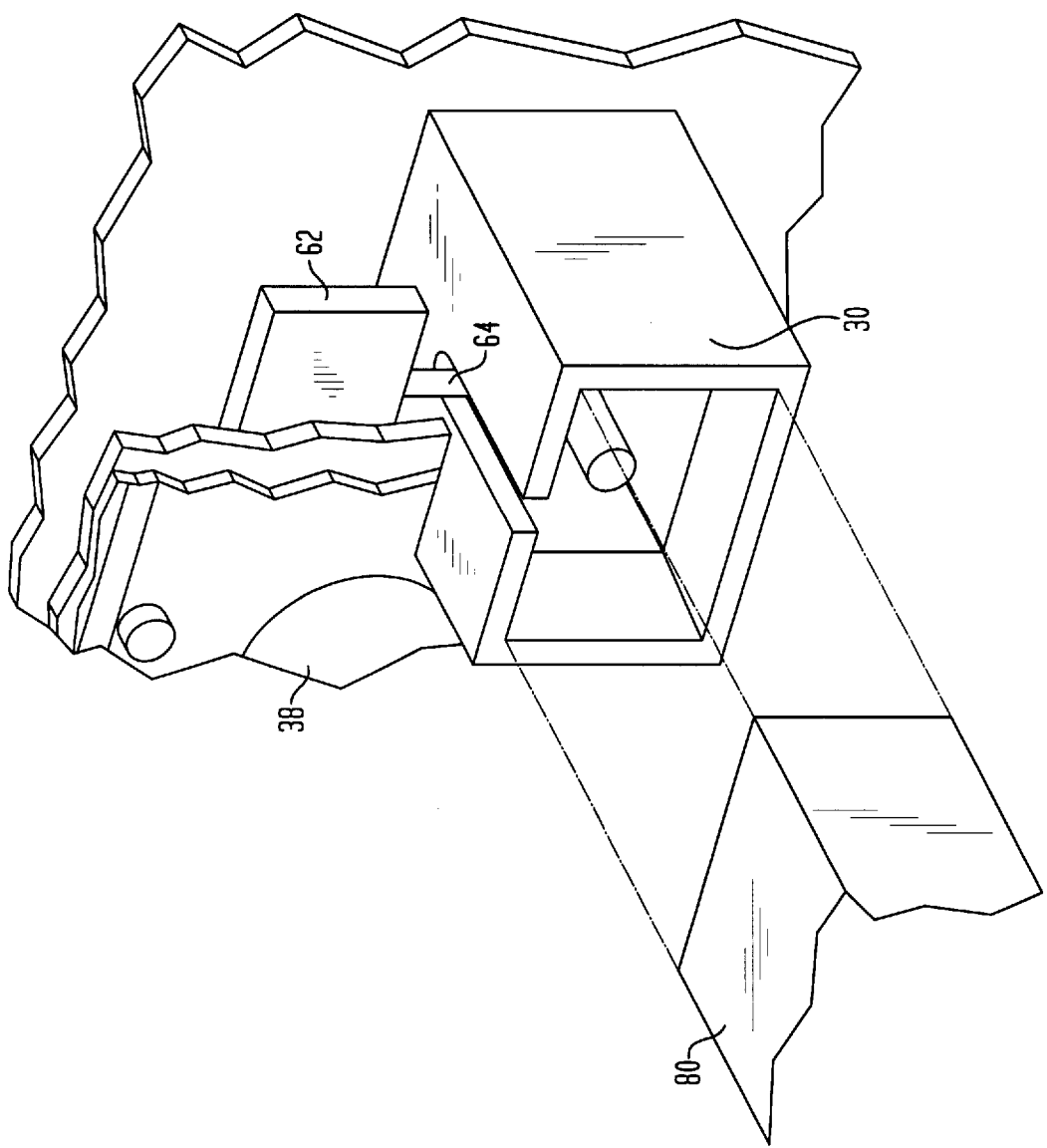
FIG. 4 is a fragmented perspective view of a segment of the face panel assembly surrounding an optical connection port.

Referring to FIG. 4, a typical prior art male optical coupling 80 is shown. Such optical couplings are commonly used as optical fiber terminations in fiber administration systems. As the optical coupling 80 is inserted into an optical connection port 30, the optical coupling 80 displaces the mechanical actuator 64 of the microswitch 62, thereby triggering the microswitch 62. The microswitch 62 then sends a signal to the systems controller 20 (FIG. 1) of the fiber administration system thereby informing the systems controller of the presence of an optical coupling in that optical connection port. Consequently, a technician no longer must depress a signal switch to inform the systems controller that an optical coupling is present. Rather, this formally manual operation is now done in an automated fashion as soon as an optical coupling 80 is inserted into a connection port 30.

The use of a microswitch 62 is merely exemplary and it should be understood that other mechanisms can be used. In the described application, the microswitch 62 is being used as a sensor to sense the presence of an optical coupling. In the prior art there are many different types of electronic components besides microswitches that can serve as sensors. For instance there are optical sensors, infrared sensors, ultrasonic sensors and the like that all are capable of sensing the presence of an optical coupling in a set location. Any such prior art sensor can be adapted for use in the present invention.

If a mechanical microswitch is used, it will be understood that there are hundreds of different types of mechanically activated microswitches. The present invention, as thus described, only shows the use of one type of microswitch. It should be understood that many other types of microswitches can be adapted for use in the present invention and that the shown embodiment of a microswitch is merely exemplary. Alternatively, the microswitch can also be formed as part of the optical connector.

The shown embodiment also contains a signal button 38 that can be activated manually. This signal button 38 is optional and need not be present. Rather, the signal button 38 is desirable only if a technician desires to initiate a line tracing subroutine from an optical connection port that already is engaged to an optical coupling.

Figure 5:
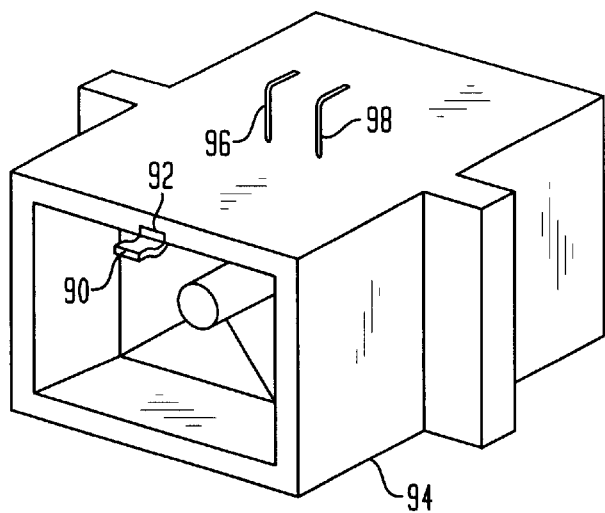
FIG. 5 is a perspective view of an alternate embodiment of an optical connector coupling.

Referring now to FIG. 5, it can be seen that electrical contacts 90, 92 can be formed into the structure of an optical connector coupling 94. Leads 96, 98 would extend from the optical connector coupling 94 that are connected to the electrical contacts 90, 92, respectively. As the optical connector coupling 94 is assembled into the face panel assembly (FIG. 3), the leads 96, 98 extending from the optical connector coupling 94 can be soldered, or otherwise connected, to a circuit board in the face panel assembly. Accordingly, when an optical coupling is inserted into the optical connector coupling 94, an electrical signal is made that can be read by the systems controller 20 (FIG. 1) of the fiber administration system.

Figure 6:
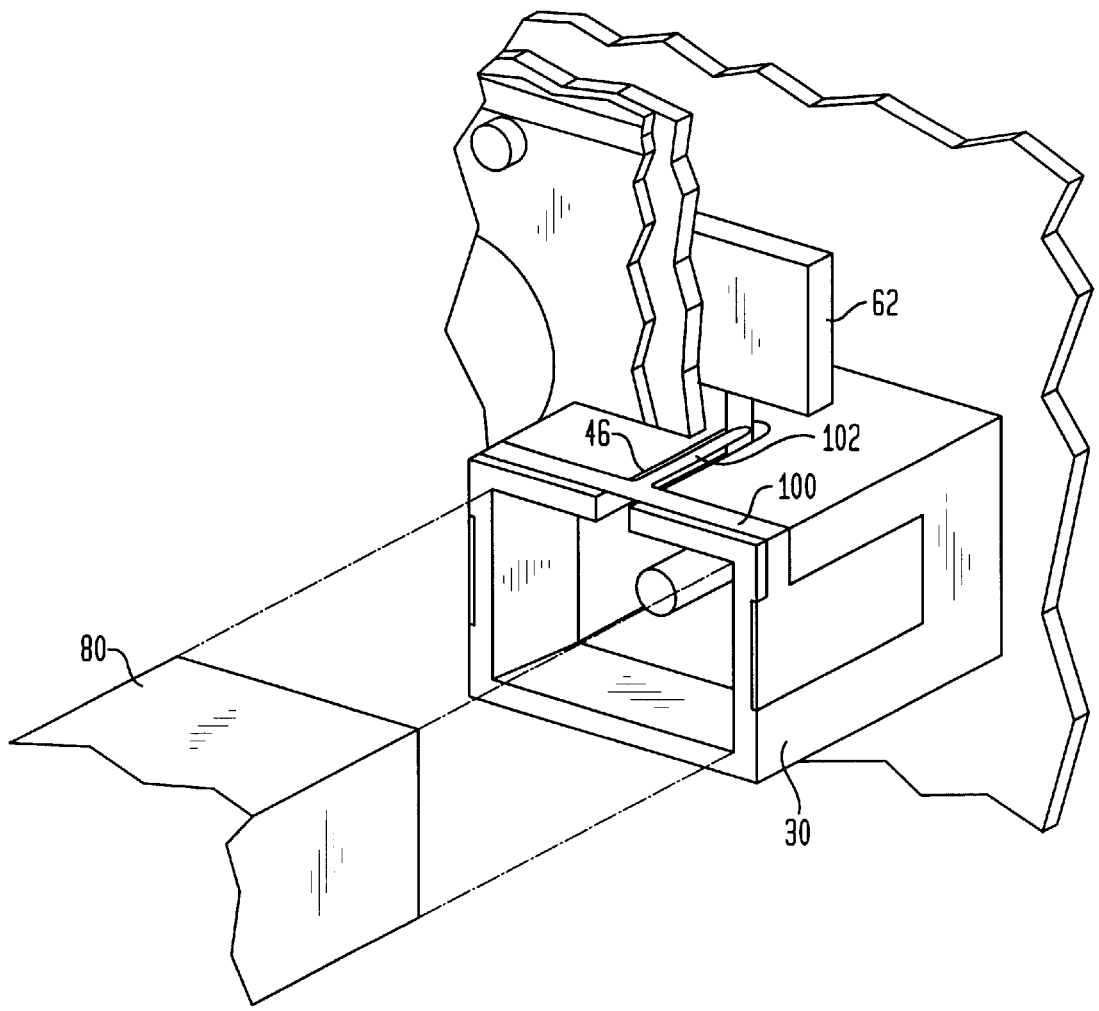
FIG. 6 is a fragmented perspective view of a segment of the face panel assembly surrounding an alternate embodiment of an optical connection port.

Referring to FIG. 6, the same embodiment as FIG. 4 is shown with an added secondary device that improves the performance of the microswitch 62. The same reference numerals are used in describing FIG. 6 that were used in describing FIG. 4. In FIG. 6, an optional metal spring clamp 100 is shown. The metal spring clamp 100 attaches to the forward end of the optical connector coupling 30. The metal spring clamp 100 includes a pawl 102 that extends across the slot 46 in the optical connection port 30. Accordingly, when an optical coupling 80 is inserted into the optical connection port 42, the optical coupling 80 displaces the metal pawl 102, thereby triggering the microswitch 62.

It will be understood that the embodiment of the present invention specificallly shown and described is merely exemplary and that a person skilled in the art can make alternate embodiments using different configurations and functionally equivalent components. For example, there can be many different face panel assembly configurations and models of optical connectors used in accordance with the present invention. All such alternate embodiments are intended to be included in the scope of this invention as set forth in the following claims.

What is claimed is:

1. A fiber administration system, comprising:
   at least one fiber distribution shelf containing a plurality of face panel assemblies, each of said face panel assemblies comprising a mounting plate, a circuit board having an aperture therein supported by said mounting plate, and a connection port affixed to said mounting plate and extending through said aperture in said circuit board, wherein each of said optical connection ports contains a sensor for detecting the physical presence of an optical coupling in that optical connection port; and
   a systems controller coupled to said sensor of each of said optical connection ports, wherein said systems controller determines from said sensor if an optical coupling is present in that optical connection port.

2. The system according to claim 1, wherein said sensor is a microswitch that is mechanically triggered by the presence of an optical coupling in an optical connection port.

3. The system according to claim 1, further including an LED associated with each optical connection port that can be selectively lit by said systems controller.

4. The system according to claim 3, further including a manual signal button located proximate each of said optical connection ports, wherein each of said manual signal buttons is connected to said systems controller.

5. The system according to claim 1, wherein said sensor is integrally formed as part of each of said optical connection ports.

6. The system according to claim 1 wherein said mounting plate has an aperture formed therein and said optical connection port extends through both said aperture in said mounting plate and said aperture in said circuit board.

7. A fiber distribution shelf assembly, comprising:
   a plurality face of panel assemblies, each of said face panel assemblies comprising a mounting plate, a circuit board having an aperture supported by said mounting plate, and an optical connection port affixed to said mounting plate and extending through said aperture in said circuit board, said optical connection port adapted to receive an optical coupling;
   a sensor associated with each of said optical connection ports for detecting the physical presence of an optical coupling in each of said optical connection ports.

8. The assembly according to claim 7, wherein said circuit board contains said sensor for each of said optical connection ports.

9. The assembly according to claim 8, wherein at least one display panel is attached to said circuit board.

10. The assembly according to claim 9, wherein said at least one display panel contains a label area for each said optical connection port on which indicia can be written to identify said at least one optical connection port.

11. The assembly according to claim 7, further including a visible LED associated with each said optical connection ports that is located proximate each of said optical connection ports.

12. The assembly according to claim 11, wherein each said LED is mounted to said circuit board.

13. The assembly according to claim 7, further including a manual signal button associated with each of said optical connection ports that is located proximate each of said optical connection ports.

14. The assembly according to claim 7, wherein said sensor is a microswitch that is mechanically triggered by the presence of an optical coupling in an optical connection port.

15. The assembly according to claim 7 wherein said mounting plate has an aperture formed therein and said optical connection port extends through both said aperture in said mounting plate and said aperture in said circuit board.

16. A face panel assembly for a fiber distribution shelf in a fiber administration system, said assembly including:
   a mounting plate defining at least one first aperture;
   a circuit board attached to said mounting plate, wherein said circuit board defines at least one second aperture that aligns with said at least one first aperture, thereby producing at least one aligned pair of apertures;
   an optical connector extending through each said aligned pair of apertures, wherein each optical connector is adapted to receive an optical coupling;
   a sensor coupled to said circuit board proximate each second aperture, wherein said sensor is capable of detecting the presence of an optical coupling engaging the optical connector extending through that second aperture.

17. The assembly according to claim 16, further including an LED coupled to said circuit board proximate each said aligned pair of apertures.

18. The assembly according to claim 17, further including a manual signal switch located on said circuit board proximate each said aligned pairs of apertures.

19. The assembly according to claim 18, further including a display panel that attaches to said circuit board, wherein said display panel contains a primary aperture that aligns with each said aligned pair of apertures and a secondary aperture that aligns with each said LED.

20. The assembly according to claim 19, wherein said display panel contains a resilient button for each said manual signal switch that enables the manual activation of each said manual signal switch.

* * * * *